(12) United States Patent
Johnson

(10) Patent No.: US 6,368,703 B1
(45) Date of Patent: Apr. 9, 2002

(54) SUPPORTED POROUS MATERIALS

(75) Inventor: James R. Johnson, Boca Raton, FL (US)

(73) Assignee: Phillips Plastics Corporation, Phillips, WI (US)

( * ) Notice: Subject to any disclaimer, the term of this patent is extended or adjusted under 35 U.S.C. 154(b) by 0 days.

(21) Appl. No.: 09/375,887

(22) Filed: Aug. 17, 1999

(51) Int. Cl.⁷ .............................. B32B 3/26; B32B 7/02
(52) U.S. Cl. ................. 428/316.6; 428/312.6; 428/218; 428/307.7
(58) Field of Search ............... 502/439; 428/307.7, 428/316.6, 312.6, 218

(56) References Cited

U.S. PATENT DOCUMENTS

| | | | |
|---|---|---|---|
| 2,093,454 A | 9/1937 | Kistler | 252/6 |
| 3,508,941 A | 4/1970 | Larson | 106/125 |
| 3,971,315 A * | 7/1976 | Hansen | |
| 4,090,022 A | 5/1978 | Tsao et al. | 536/57 |
| 4,246,221 A | 1/1981 | McCorsley, III | 264/203 |
| 4,341,663 A | 7/1982 | Derleth et al. | 252/463 |
| 4,416,698 A | 11/1983 | McCorsley, III | 106/163 |
| 4,916,110 A * | 4/1990 | Manniso | 502/439 |
| 5,055,429 A | 10/1991 | James et al. | 501/80 |
| 5,252,284 A | 10/1993 | Jurovic et al. | 264/187 |
| 5,266,548 A * | 11/1993 | Koradia et al. | 502/439 |
| 5,472,927 A * | 12/1995 | Mulder et al. | 502/439 |
| 5,540,874 A | 7/1996 | Yamada et al. | 264/187 |

FOREIGN PATENT DOCUMENTS

NL    WO 91/12879    *    9/1991

OTHER PUBLICATIONS

Harmon et al, "Thermodynamic and IR study of the hydrates of N–methylmorpholine oxides and quinucdlidine oxide. Effect of hydrate stoichiometry on strength of H–O–H . . . O–N hydrogen bonds; implications for the dissolution of cellulose in anime oxide solvents.", *Journal of Molecular Structure*, Eleseview Science Publishers 1992.

Maruno et all, "Micro–observation and characterization of bonding between bone and HA–glass–titanium functionally gradient composite", *Biomaterials* Mar. 1991, vol. 12.

* cited by examiner

*Primary Examiner*—Steven P. Griffin
*Assistant Examiner*—Christina Ildebrando
(74) *Attorney, Agent, or Firm*—Fredrikson & Byron, P.A.

(57) ABSTRACT

A strong, porous article comprising a strong porous carrier having an outer surface defining a shape having a bulk volume and having pores defining interconnecting fluid flow openings extending throughout the bulk volume and opening through said surface. A second porous material, the mean pore size of which is at least an order of magnitude less than the mean pore size of the porous carrier, is nested within and structurally supported by the pore walls of the carrier so that the second porous material maintains its porous configuration and its pores are accessible to a fluid flowing through the pores of the porous carrier.

18 Claims, No Drawings

SUPPORTED POROUS MATERIALS

FIELD OF THE INVENTION

The invention is in the field of porous materials having large surface areas for use in chemical catalysis, molecular separations, and the like.

BACKGROUND OF THE INVENTION

The mechanical strength of articles that have a porous structure depend, among a variety of factors, upon the nature of the structural material, the sizes of the pores, the "porosity" or void volume, and the nature or shape of the pores. As a general but by no means rigorous rule, for a given rigid or brittle material, mechanical strength decreases as porosity increases. The specific surface of a porous material increases with decreasing pore size for a constant void volume, and increases also with increasing void volume. The decrease of mechanical strength with increasing porosity appears to be intuitive in that the greater the porosity, the thinner must be the walls separating adjacent pores, and hence the weaker the walls must be.

A porous material having a substantial void volume is described in Kistler, U.S. Pat. No. 2,093,454. Here, a liquid is removed from a gel at a temperature above the critical temperature of the liquid to leave a dry porous gel structure. The gel is said to undergo little shrinkage as the solvent is removed. Kistler refers to his materials as "aerogels", and it is taught that these gels can contain as little as one percent or less of solid material by volume. They are, as a result, often very fragile and hence difficult to use.

Another porous material with extremely small pores is taught in "*Ultrastable Mesostructured Silica Vesicles*", S. S. Kim, W. Zhang, T. J. Pinnavaia, *Science* 282, 1302–1305 (1998). This porous material is of silica, and the pores may have mean diameters ranging from about 2.7 to about 4.0 nm. The authors refer to the use of such materials in chemical catalysis and molecular separations, and the authors report having incorporated redox-active Ti(IV) and acidic Al(III) centers into the framework of their materials. Specific surfaces measured in the hundreds of $m^2/g$ are reported.

Extremely weak and fragile porous materials having pores that are to be contacted with a liquid or gas are difficult to work with because they are difficult to shape and difficult to support. They may be supported as a layer upon a supporting surface, for example. Although microporous materials themselves may have very high specific surfaces (that is, surface per unit mass), the materials themselves, when coated upon a support, provide only a limited macrosurface to come into contact with gases or liquids. Because the highly porous materials are so fragile, they cannot generally be formed into separate shapes that have greater surface areas, on a macro level, for contact with liquids or gases.

It would be desirable to provide a structure in which porous materials may be so fashioned as to render them highly available for contact to liquids and gases.

SUMMARY OF THE INVENTION

It has been found that porous materials having small pores, that is, not greater than about 100 nm and preferably in the range of about 5 to about 100 nm may themselves be supportively nested in the pores and supported on the pore walls of a relatively strong porous carrier having pore sizes at least one and preferably at least two orders of magnitude greater than the pore size of the smaller pore material. The pores of the small pore material open onto the pores of the porous carrier. By utilizing the pore walls of the porous carrier to support the smaller pore material, the available "macro" surface of the smaller pore material is greatly increased so that liquids or gases flowing through the volume of pores of the porous carrier may readily access the pores of the smaller pore material. Because the area of contact between the smaller pore material and the supporting pore walls of the porous carrier material is quite large, the structural support provided by the porous carrier to the smaller pore material is substantial.

Accordingly, the invention relates to a strong, porous article comprising a porous carrier having an outer surface defining a shape having a bulk volume and having interconnecting pores providing fluid flow openings extending throughout the bulk volume and opening through the outer surface. The porous carrier has a plurality of continuous strong supportive struts defining walls bounding the pores, the pores preferably having a mean size not greater than about 100 microns. A second porous material, the mean pore size of which is at least an order of magnitude less than the mean pore size of the porous carrier, is nested within and structurally supported by the pore walls of the porous carrier so that the second porous material maintains its porous configuration. The pores of the second porous material open onto the fluid flow openings of the porous carrier and are accessible to a fluid flowing through the pores of the carrier.

In a preferred embodiment, the porous carrier has an mean pore size in the range of about 0.3 to about 10 microns, and the second porous material has a pore size at least an order of magnitude smaller, preferably in the range of about 1 to about 100 nm.

DESCRIPTION OF THE PREFERRED EMBODIMENTS

For use in describing the invention, "mesoporous" may be used to describe a porous material having a substantial specific surface and to which access is desired. Mesoporous materials commonly have pore sizes in the nanometer range, often ranging from about 1 to about 100 nm. These materials often are characterized by having extremely weak physical structures that often are only barely self-supporting, although some mesoporous materials can be somewhat stronger. "Microporous" may be used herein to refer to pore structures having pore sizes in the micron range, particularly in the range of about 0.3 to about 10 microns. These materials commonly are much stronger in mechanical strength than the mesoporous materials. Finally, "Macroporous" may be used to refer to pores that are generally measured in hundreds of microns, commonly in the 100 to 500 micron range. Porous materials of this type are shown in International Publication No. WO 99/16479.

The present invention is particularly valuable in supporting mesoporous structures within the pores of a micro or macroporous structure, but on a broad basis, the invention is applicable to any combination of two porous structures in which one structure, having larger pores, serves as a support for the material having smaller pores. The pore size of the smaller pores is at least one and preferably at least two orders of magnitude less than the pore size of the carrier material. The pores of the smaller pore material open onto and communicate with the passages defined by the pores of the porous carrier. The pores of the porous carrier serve to support the second porous material, which is particularly valuable when the second porous material has little mechanical strength, especially when the second porous material is so weak as to be non self supporting or cannot be mechanically worked from one shape to another.

The sizes of pores of the various materials referred to herein are mean sizes. Conceptually, it is convenient to think of a pore having a minimum diameter of, for example, 100 microns, as being capable of accommodating the passage through it of a "worm" having a round cross section and a transverse diameter of 100 microns. Put another way, a 100-micron opening should enable passage through it of a sphere having a 100-micron diameter. Although I am aware of no completely satisfactory way for measuring the sizes of pores, it is possible to examine a scanning electron micrograph or other photograph of enlarged cross section of a porous material, and view the pores as planar projections of the structure. Here, lines may be drawn across the micrograph and the size of the openings that intersect the lines is measured. Averaging and standard deviation techniques may be used to permit the mean size of the openings to be assessed.

In the manufacture of articles of the invention, it is generally preferred to first complete the fabrication of the carrier porous material, that is, the material having the larger pores, and then fabricate the smaller pore material in situ. A concept central to the invention is that the material with the smaller pores—e.g., a mesoporous material—must be situated within the pores of the larger pore material such that the smaller pores open onto the interior of the larger pores; that is, the smaller pores are accessible by a fluid flowing through the larger pores.

Preferably, the second porous material substantially fills the volume of the pores of the porous carrier so that substantially the entire surface of the pores of the second porous material is made available for contact by a liquid or gas flowing through the pores of the porous carrier. If desired, however, the second porous material may be carried by the pore walls of the carrier but may leave a central portion of the carrier pores unoccupied to facilitate the flow of a fluid through the carrier pores. This may be particularly advantageous when the surface of the second porous material is catalytic.

Although the role of the porous carrier is largely one of support, the walls of the porous carrier may be formed of, or coated with, other reactants or materials that can augment fundamental processes to be carried out by the smaller pore material. For example, while the second porous material may have one catalyst on its porous surface, the larger pore carrier material may have a second, synergistic catalyst or factor which, though present in a lesser amount, may be critical to the desired reaction. In general, the pores of the larger pore size carrier material are compatible with the smaller pore size material supported by the walls. The second porous material may be reacted with, sintered to, or adhered to the walls of the carrier material through the use of an intermediate material, for example. It will be understood that the pores of the carrier material (and for that matter preferably the pores of the second porous material) are interconnecting and extend through the volume of the material, the pores defining tortuous paths for fluid flow. If desired, the second porous material may be physically contained in the tortuously configured larger pores.

The surface of the pores of the carrier material may first be coated with a catalyst, for example, and the second porous material may be carried by the catalyst coated surface, the pores of the second porous material communicating with the catalyst bearing surface of the carrier material. As required, the carrier material itself may be formed with two or more layers. For example, the carrier material may be formed of a ceramic material such as zirconia, with thin layers of alumina, hydroxy apatite or other materials carried by the zirconia.

A variety of porous carrier materials can be employed in the invention; however, it is preferred to employ micro and macro reticulated structures that are characterized by significant mechanical strength and particularly compressive strength, and, to the extent desired, chemical inertness. Although porous materials of various types may be employed in the present invention, porous ceramics are preferred.

In the field of ceramics, in which ceramic materials are formed by sintering together ceramic particles, avoidance of porosity is the common goal to achieve maximum possible density and strength, among other desired properties. See Kingery, W. D., et al., *Introduction to Ceramics*, John Wiley & Sons, 1976. In some cases, however, ceramic materials that have some porosity may be useful as thermal insulation, or as materials that simulate bone. Examples of such ceramics are porous materials made from alumina, zirconia, mullite, hydroxy apatite, and mixtures or combinations of these materials. Rice, *Porosity of Ceramics*, Marcel Dekker, Inc., 1998, provides a review of porous ceramic materials and particularly their properties.

Porous articles may be made from powdered ceramic materials by a number of methods. For example, particles of ceramic may be simply compressed and sintered. To obtain some open pores, the particles, which may be in the form of beads, must be only slightly or partially sintered at their contact points, and this usually provides a mechanically weak structure. Further sintering improves strength, but leads to the formation of an unwanted (for the purposes of the desired products of the invention) largely closed pore structure. In another example, ceramic powders may be mixed with foaming or blowing agents; but activation of a foaming agent commonly leads to the formation of a closed pore structure. In yet another example, ceramic powders may be mixed with organic particulates which burn out when the shaped ceramic structure is raised to sintering temperatures. This procedure leads to the formation of a macroporous structure. Insulating bricks made this way, for example, may have much larger pores of this kind.

As macroporous ceramic materials, the products just described are inferior for the purposes of the invention to porous products made by coating the porous surfaces of a porous organic material such as a plastic foam or sponge with a ceramic slip, the organic material being thereafter removed as by pyrolysis, and the remaining ceramic is sintered. This method, which is a method taught in International Publication No. WO 99/16479, provides a porous product that mimics in configuration the organic material from which it was made; that is, the organic material serves as a macro "template" for the resulting porous ceramic article. The ceramic articles made in this manner hence can have substantially completely open pores, can be carefully controlled as to pore size, and thus can serve as excellent porous carriers for products of the invention.

Another material is a microporous structure that has pores 10 to 100 fold or more smaller than the pores of the material described immediately above. This material, which suitably can be carried in the pores of a porous carrier such as the material described above, utilizes a cellulosic material as a micro "template" to guide and structure ceramic particles. These porous articles may be made by combining cellulose or a cellulose-like polymer (that is, a gel-forming polymer)

with a solvent therefore such as N-methyl morpholine oxide (hereafter sometimes referred to as "NMMO") to form a sol, incorporating a powdered ceramic such as alumina in the sol, forming the sol into a desired shape, such as a strip or bead of material, extracting the solvent from the article using a non-solvent for the cellulose or other gel-forming polymer, heating to pyrolyze the cellulose or other gel forming polymer and eventually sintering the article. Here, the ceramic particles are believed to align themselves along pathways provided by the cellulosic microfibrils as the sol is reconstituted as a gel following removal of the NMMO solvent. As the resulting product is heated, water is lost and some shrinkage of the cellulose gel network occurs, the ceramic particles retaining to a significant extent their relative positions with respect to each other. Once the cellulose has been removed, as by pyrolysis, the ceramic particles, which at this point are in contact with one another, sinter together, the sintered structure reflecting at least to some extent the structure and configuration of the cellulosic template.

Yet other kinds of porous materials are mesoporous structures having pores about 100 fold smaller than those of the microporous structures described above. One such mesoporous structure is referred to in Kistler, U.S. Pat. No. 2,093,454, as an "aerogel". Here, water in a gel is replaced with another liquid, and that liquid is removed from the gel at a temperature above the critical temperature of the liquid to leave a dry porous gel structure. Ceramic structures made by this method do not undergo substantial shrinkage, and may have open void volumes of 95% or more but are extremely fragile.

Mesoporous materials include natural zeolite minerals or synthetic versions that have pores sized in the nanometer size range. Other mesoporous materials are those described in "Ultrastable Mesostructured Silica Vesicles", S. S. Kim, W. Zhang, T. J. Pinnavaia, Science 282, 1302–1305 (1998), referred to above and incorporated herein by reference. The latter porous material is of silica, the pores having mean diameters ranging from about 2.7 to about 4.0 nm. See also F. Linsker and R. L. Evans, J. Am. Chem. Soc. 67, 1581 (1945); P. T. Tanev and T. J. Pinnavaia, Science 271, 1267 (1996); P. T. Tanev, Y. Liang and T. J. Pinnavaia, J. Am. Chem. Soc. 119, 8616 (1997), and K. M. McGrath, D. M. Dabbs, N. Yao, I. A. Aksay, S. M. Grunetz, Science 277, 552 (1997).

EXAMPLE 1

In a 150 ml beaker is placed 70 cc of an N-methyl morpholine oxide ("NMMO")/water solution in a 50:50 mixture by weight. Using a stir bar on a magnetic stirring heating mantle, the mixture is stirred at a medium rate to avoid entrainment of air while 2.6 g of fibrous cellulose (obtained by shredding filter paper) is added. The mix is then heated to 105° C. with constant stirring to form a smooth, clear, viscous, light orange sol. While this sol is still hot, 15.0 g of hydroxyapatite powder with an mean particle (agglomerate) size of 5 μm (Plasma Biotal Ltd.) is added and is stirred into the viscous sol until an even suspension forms, identifiable by the lack of hydroxyapatite clumps and by an overall smooth, milky white appearance.

The resulting viscous mixture is then poured drop-by-drop into water whereupon the drops coagulate to form beads as the NMMO is extracted, the hydroxyapatite powder being supported by and hence aligned with the cellulose fibrils. The resulting beads are removed from the water and air dried at room temperature for approximately 24 hours and heated in a forced air oven at 50° C. for 2 hours to ensure dryness. The beads are then heated in air to 1200° C. to pyrolyze the cellulose, and are held at this temperature for 2 hours to sinter the interconnected and aligned hydroxyapatite particles. The resulting ceramic beads are smooth, light blue in color, and have interconnected openings on the order of one to several microns in size. If sintering occurs instead in an inert atmosphere, the resulting beads are white.

Upon cooling to room temperature, the ceramic beads are impregnated with a 1:9 (v/v) ethanol to water solution containing tetraethyl orthosilicate ("TEOS") and a neutral gemini surfactant of the formula

wherein n is 12, in accordance with the teachings of S. S. Kim, W. Zhang, and T. J. Pinnavaia, *Ultrastable Mesostructured Silica Vesicles*, cited above. The molar ratio of this mixture is 1 TEOS:0.25 surfactant:4.3 ethanol:78 water. The impregnant is polymerized in situ within the openings of the ceramic beads under hydrothermal conditions by heating to about 100° C. in an autoclave for about 48 hours, and then is washed with ethanol and dried in air. The mesostructured silica resulting has pore sizes as small as about 3.2 nm (i.e., about $10^3$ times smaller than the ceramic openings) and is nested and supported in the openings of the ceramic which provides a novel protective container giving it greater strength for use and yet providing open access to the more fragile silica mesostructure.

EXAMPLE 2

Example 1 is substantially repeated except that the ceramic powder is alumina, yielding ceramic alumina beads having openings ranging in size from about 0.3 to about 1 micron which receive and support the mesostructured silica.

EXAMPLE 3

Example 1 is substantially repeated except that the ceramic powder is zirconia, yielding ceramic zirconia beads having openings of about 1 micron in size and which receive and support the mesostructured silica.

EXAMPLE 4

Example 1 is substantially repeated except that sintering is continued to provide an alumina structure having openings of about 0.1 micron in size, that is, about an order of magnitude smaller than the openings of the ceramic beads of Example 1.

EXAMPLE 5

Example 4 is substantially repeated utilizing a zirconia powder size and sintering conditions yielding ceramic zirconia beads having openings of about 10 microns in size and which receive and support the mesostructured silica.

EXAMPLE 6

A zirconia slip was prepared by combining the following ingredients and mixing them thoroughly by ball milling in a polyethylene container using zirconia media:
150 grams partially stabilized zirconia powder (Zirconia Sales America)
2.25 grams dispersant (Rohm and Haas, product D-3021)
15 grams binder (Rohm and Haas product designation B-1000)
0.375 grams surfactant/wetting agent (Air Products Surfynol™ TG)

0.26 grams anti-foaming agent (Henkel Nopco™ NXZ)
36 ml deionized water

Pieces of reticulated polyester-polyurethane foam 10–80 pores per inch (Stephenson and Lawyer) were immersed in the above slip and repeatedly compressed to remove air bubbles trapped inside. The foams were removed from the slip and the excess slip was allowed to drain. Further excess slip was removed by passing the foams between a pair of stainless steel squeeze rollers several times. The resulting pieces were allowed to dry at room temperature followed by drying at temperatures up to 100° C. in air. When the pieces appeared dry, they were heated to pyrolyze and remove organics (binder, dispersant, surfactant, anti-foam agent, and reticulated polymer foam) and then were sintered at a temperature of about 1400° C. for one hour, following which the furnace is cooled to room temperature at a rate of about 10° C. per minute. The resulting pieces are strong and have openings of about 100 microns in size.

Following the procedure of Example 1, a silicate mesostructure is formed in and is supported by the openings of the zirconia article.

EXAMPLE 7

Cubes of ceramic material (alumina) are made by the procedure of Example 6, and have a continuum of openings in 3 dimensions where the openings are of the order of 100 microns. To 44 grams of magnesium nitrate hydrate is added sufficient glycerin to make a volume of about 50 cc. 35 cc of diethyl amine in 65 cc glycerin is added and the mix is vigorously shaken and immediately impregnated into the ceramic cubes to form a gel within the openings. Additional glycerine can be employed to reduce the viscosity of the mix and enable it to be more easily impregnated in the cubes. The glycerin contained in the gel is removed by extraction with and replacement by ethanol without appreciable change in volume of the gel, and the ethanol is in turn extracted and cyclohexyl acrylate and 5% acrylic acid, and reference is made to Johnson, U.S. Pat. No. 3,444,925, the teachings of which are incorporated herein by reference. The mixture is ball-milled for 8 hours to produce a ceramic slip, which is then used to produce porous cubes of green (unsintered) ceramic material (alumina) utilizing the procedure of Example 6.

Into the pores of the resulting dried reticulated structure is squeezed the viscous mixture containing cellulose, NMMO and hydroxyapatite of Example 1 until the openings are substantially filled. The cubes are then immersed in water for a period sufficient to enable extraction and replacement of the NMMO by water, the water being changed often to promote the process. The resulting cubes of composite material are carefully dried to remove the water, and then are slowly raised to a sintering temperature of 1300° C., the cellulose binder being pyrolyzed as the temperature is raised. The cubes are held at this temperature for 2 hours to co-sinter the alumina host structure and the interconnected and aligned hydroxyapatite particles, forming a porous structure having a mean pore size of about 1 micron. Shrinkage of the cel-ceramic material and the supporting alumina structure occurs during the drying and co-sintering process.

While preferred embodiments of the invention have been described, it should be understood that various changes, adaptations and modifications may be made therein without departing from the spirit of the invention or the scope of the appended claims.

What is claimed is:

1. A porous article comprising a self supporting porous carrier having an outer surface defining a shape having a bulk volume and having pores defining interconnecting fluid flow openings extending throughout said volume and opening through said surface, said carrier having a plurality of continuous supportive struts defining walls bounding said pores and said pores having a mean size, and a second porous material, the mean pore size of which is at least an order of magnitude less than the mean pore size of said carrier, the second porous material extending throughout the extent of said interconnecting fluid flow openings and throughout the extent of said volume, said second porous material being nested within and structurally supported by the pore walls of said carrier so that said second porous material maintains its porous configuration and its pores open onto and are accessible to a fluid flowing through said interconnected fluid flow openings of the porous carrier.

2. The porous article of claim 1 wherein the mean size of said carrier pores is in the range of about 100 to about 500 microns.

3. The porous article of claim 1 wherein the mean size of said carrier pores is not greater than about 100 microns.

4. The porous article of claim 3 wherein the mean pore size of said second porous material is in the range of about 0.3 to about 10 microns.

5. The porous article of claim 1 wherein the mean pore size of said porous carrier is in the range of about 0.3 to about 10 microns.

6. The porous article of claim 5 wherein the mean pore size of said second porous material is in the range of about 1 to about 100 nm.

7. The porous article of claim 1 wherein the mechanical strength of said second porous material is substantially less than the mechanical strength of said article.

8. The porous article of claim 6 wherein the mechanical strength of said second porous material is so low as to render said porous material by itself unable to be mechanically worked from one shape to another.

9. The porous article of claim 1 wherein the pores of said second porous material define interconnecting fluid flow openings that open onto the pores of the porous carrier.

10. The porous article of claim 8 wherein said second porous material substantially fills the pores of said porous carrier.

11. The porous article of any one of claims 1–10 wherein the mean pore size of the second porous material is at least two orders of magnitude less than the mean pore size of said porous carrier.

12. The article of claim 1 wherein said second porous material is a ceramic.

13. The article of any one of claims 1–10 or 12 in which the carrier is a ceramic.

14. A porous article comprising a self supporting porous carrier having an outer surface defining a shape having a bulk volume and having pores defining interconnecting fluid flow openings extending throughout said volume and opening through said surface, said carrier having a plurality of continuous supportive struts defining walls bounding said pores and said pores having a mean size, and a second porous material having pores defining interconnecting fluid flow openings, the mean pore size of which is at least an order of magnitude less than the mean pore size of said carrier, the second porous material extending throughout the extent of said interconnecting fluid flow openings and throughout the extent of said volume, said second porous material being nested within and structurally supported by the pore walls of said carrier with the pores of the second porous material opening onto the pores of the carrier so that the pores of said second porous material are accessible to a fluid flowing through the pores of said carrier.

15. A porous article comprising a self supporting porous carrier having an outer surface defining a shape having a bulk volume and having pores defining interconnecting fluid flow openings extending throughout said volume and opening through said surface, said carrier having a plurality of continuous supportive struts defining walls bounding said pores and said pores having mean size in the range of about 0.3 to about 10 microns, and a second porous material having pores defining interconnecting fluid flow openings, the mean pore size of which is in the range of about 1 to about 100 nm, the second porous material extending throughout the extent of said interconnecting fluid flow openings and throughout the extent of said volume, said second porous material being nested within and structurally supported by the pore walls of said carrier with the pores of the second porous material opening onto the pores of the carrier so that the pores of said second porous material are accessible to a fluid flowing through the pores of said carrier.

16. A porous article comprising a self supporting porous ceramic carrier having an outer surface defining a shape having a bulk volume and having pores defining interconnecting fluid flow openings each extending throughout said volume and opening through said surface, said carrier having a plurality of continuous supportive struts defining walls bounding said pore and said pores having a mean size, and a second porous ceramic material having pores defining interconnecting fluid flow openings, the mean pore size of which is at least an order of magnitude less than the mean pore size of said carrier, the second porous material extending throughout the extent of said interconnecting fluid flow openings and throughout the extent of said volume, said second porous material being nested within and structurally supported by the pore walls of said carrier with the pores of the second porous material opening onto the pores of the carrier so that the pores of said second porous material are accessible to a fluid flow through the pores of said carrier.

17. The porous article of claim 16 in which said ceramic carrier and said second porous ceramic material are sintered together.

18. A porous article comprising a self supporting porous carrier having an outer surface defining a shape having a bulk volume and having pores defining interconnecting fluid flow openings extending throughout said volume and opening through said surface, said carrier having a plurality of continuous supportive struts defining walls bounding said pores and said pores having a mean size, and a second porous material, the mean pore size of which is at least an order of magnitude less than the mean pore size of said carrier, the second porous material extending throughout the extent of said interconnecting fluid flow openings and throughout the extent of said volume, a central portion of said pores being unoccupied to facilitate the flow of a fluid through the carrier pores, said second porous material being nested within and structurally supported by the pore walls of said carrier so that said second porous material maintains its porous configuration and its pores open onto and are accessible to a fluid flowing through said interconnected fluid flow openings of the porous carrier.

* * * * *